US006988756B1

(12) United States Patent
Meinke et al.

(10) Patent No.: US 6,988,756 B1
(45) Date of Patent: Jan. 24, 2006

(54) MODULAR EXTENDER TAILGATE

(76) Inventors: Joseph S. Meinke, 15289 Silverbeach Dr., Gowen, MI (US) 49326; Robert L. Bingle, 3102 Crestbrook Dr., Zeeland, MI (US) 49464; Thomas R. Futryk, 15335 Harry, Grand Haven, MI (US) 49417; Todd W. Pastrick, 14216 Taft Rd., Spring Lake, MI (US) 49456

( * ) Notice: Subject to any disclaimer, the term of this patent is extended or adjusted under 35 U.S.C. 154(b) by 0 days.

(21) Appl. No.: 10/989,936

(22) Filed: Nov. 16, 2004

(51) Int. Cl.
*B62D 33/03* (2006.01)
*B60P 7/15* (2006.01)

(52) U.S. Cl. ..................... 296/50; 296/26.08
(58) Field of Classification Search .............. 296/50, 296/57.1, 62, 26.01, 26.08, 26.09, 26.1; 280/163, 280/166
See application file for complete search history.

(56) References Cited

U.S. PATENT DOCUMENTS

| 4,021,071 A | 5/1977 | Norman ................... 296/62 |
| 4,139,078 A | 2/1979 | Keller ..................... 182/88 |
| 4,529,244 A | 7/1985 | Zaydel .................... 296/191 |
| 4,531,773 A | 7/1985 | Smith ...................... 296/26 |
| 4,639,032 A | 1/1987 | Barbour ................... 296/62 |
| 4,707,016 A | 11/1987 | McDonald ................. 296/39 |
| 4,846,487 A | 7/1989 | Criley .................... 280/166 |
| 5,028,063 A | 7/1991 | Andrews .................. 280/166 |
| 5,265,450 A | 11/1993 | Doyle ..................... 70/118 |
| 5,372,397 A | 12/1994 | Arndt ..................... 296/39.2 |
| 5,451,089 A | 9/1995 | Bender .................... 296/57.1 |
| 5,468,038 A | 11/1995 | Sauri ..................... 296/57.1 |
| 5,478,130 A | 12/1995 | Matulin et al. ........... 296/57.1 |
| 5,658,033 A | 8/1997 | Delaune ................... 12/296 |
| 5,732,995 A | 3/1998 | Piccariello .............. 296/57.1 |
| 5,732,996 A | 3/1998 | Graffy et al. ............ 296/62 |
| 5,741,039 A | 4/1998 | Habdas .................... 296/57.1 |
| 5,788,311 A | 8/1998 | Tibbals ................... 296/62 |
| 5,803,523 A | 9/1998 | Clark et al. ............. 296/26.1 |
| 5,820,193 A | 10/1998 | Straffon .................. 296/62 |
| 5,944,373 A | 8/1999 | Seksaria et al. .......... 296/57.1 |
| 5,947,540 A | 9/1999 | Pariseau et al. .......... 296/57.1 |
| 6,019,418 A | 2/2000 | Emerling et al. .......... 296/146.8 |
| 6,045,172 A | 4/2000 | Thomas et al. ............ 296/26.1 |
| 6,082,801 A | 7/2000 | Owen et al. .............. 296/26.11 |
| 6,120,076 A | 9/2000 | Adsit et al. ............. 296/26.11 |
| 6,142,548 A | 11/2000 | Kuhn et al. .............. 296/26.1 |
| 6,209,366 B1 | 4/2001 | Zagoroff ................. 70/208 |
| 6,364,392 B1 | 4/2002 | Meinke ................... 296/62 |
| 6,431,630 B1 | 8/2002 | Meinke ................... 296/50 |

OTHER PUBLICATIONS

ADAC Tailgate Module Benchmarking, 6 pages showing commercially available tailgate accessories.

*Primary Examiner*—H. Gutman
(74) *Attorney, Agent, or Firm*—Young & Basile, P.C.

(57) ABSTRACT

A tailgate of modular construction and employing an extender assembly. The tailgate employs a thick central molded plastic core structure and inner and outer cover sheets secured to inboard and outboard faces of the core structure. The core structure defines laterally spaced vertically extending channels and the extender assembly includes a pair of laterally spaced post assemblies slidably mounted in the respective channels of the core member and connected at their upper end by a bar member which fits in a pocket defined in the upper face of the tailgate with the extender assembly in its lowered position.

19 Claims, 13 Drawing Sheets

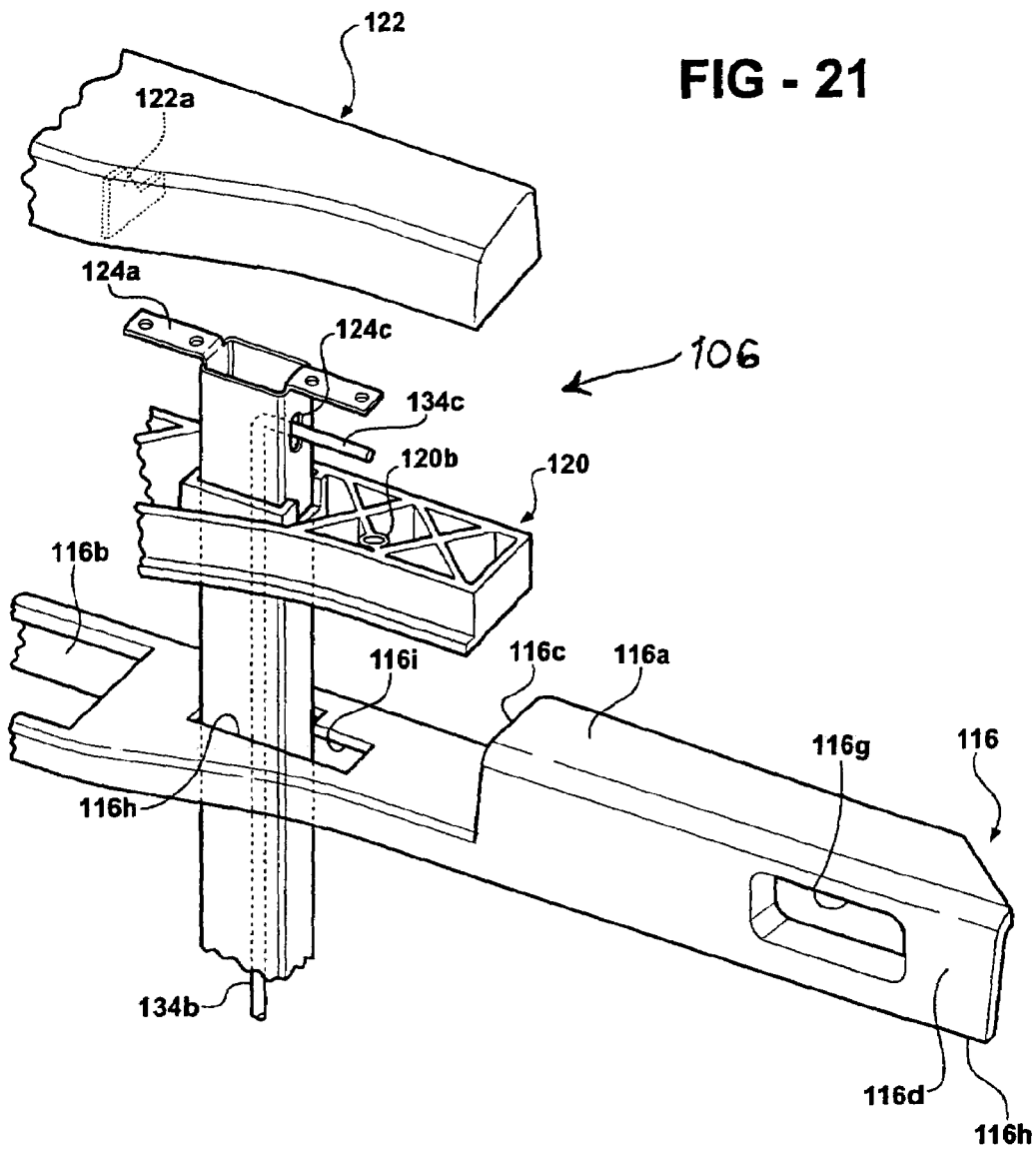

MODULAR EXTENDER TAILGATE

BACKGROUND OF THE INVENTION

This invention relates to motor vehicles of the pickup type and more particularly to a tailgate assembly for use with a motor vehicle of the pickup type.

The pickup truck is among the most popular of vehicles sold. It includes a cabin, a bed section for carrying cargo, and a swinging tailgate to retain cargo in the bed. The tailgate assembly is typically formed in a metal forming operation from stamped metal panels which are welded together to form the tailgate. Then latches are added on either side of the tailgate to engage strikers on the pickup sides and a handle is provided to operate the latches to open and close the tailgate assembly and allow the tailgate to move between a raised position in which the tailgate closes the pickup bed and a lowered position in which the tailgate acts as a loading platform for the bed. Whereas these prior art tailgate assemblies provide a durable and secure closure for the pickup bed and are generally satisfactory, their manufacture is extremely labor and tooling intensive with the result that the tailgate assembly represents an extremely expensive component of the overall vehicle. Further, whereas pickup tailgates of this type are extremely useful, there are usage situations in which the tailgate does not provide adequate load support and/or load restraint.

SUMMARY OF THE INVENTION

This invention is directed to an improved tailgate assembly for a motor vehicle of the pickup type.

More specifically, this invention is directed to a tailgate utilizing a modular construction and providing an extender assembly to provide supplemental load support and/or load restraint.

The tailgate assembly is for use with a motor vehicle of the type including a cab and a cargo body positioned rearwardly of the cab and including sidewalls and a floor coacting at the rear of the cargo body to define a tailgate opening. A generally planar tailgate having a width approximating the width of the tailgate opening is fitted and encloses the tailgate opening and means are provided for mounting the tailgate on the cargo body for pivotal movement between a raised position in which the tailgate closes the opening and a lowered position in which the tailgate extends rearwardly of the cargo body as an extension of the cargo body floor. The tailgate assembly further includes latch means for coaction with latch means on the cargo body to maintain the tailgate in its raised position.

According to the invention, the tailgate comprises a module for combination with a tailgate outer panel assembly to form a tailgate and the module includes a main body structure and an extender assembly mounted on the main body structure and including an upper lateral structure moveable between a stowed position proximate an upper edge of the main body structure and an extended position spaced from the upper edge. This invention combines the advantages of a modular construction with the advantages of an extender assembly construction.

According to a further feature of the invention, the main body structure defines a pair of laterally spaced, vertically extending channel structures; the upper lateral structure comprises a bar; and the extender assembly further includes a pair of laterally spaced post assemblies secured at their upper ends to laterally spaced points on the bar and respectively slidably received in the channel structures. This arrangement allows the tailgate to be selectively extended in a manner to selectively address various unique load requirements of the vehicle.

According to a further feature of the invention, the extender assembly is further moveable to a displaced position removed from the plane of the tailgate; each post assembly includes a lower post member articulated to an upper post member connected to the bar; and the axes of articulation are positioned above the upper edge of the main body structure with the bar in its extended position whereby to allow the bar to be moved from its extended position to its displaced position by pivotal movement of the upper post member and the bar about the axes of articulation. This arrangement allows the extender to be moved quickly and efficiently between its various positions.

According to a further feature of the invention, the module further includes catch means selectively operable to fixedly but releasably secure the bar in its stowed position, its extended position, and its displaced position. This arrangement allows the extender to be fixedly but releasably secured in its various position.

According to a further feature of the invention, the catch means comprise coacting catch devices on each post assembly proximate the axis of articulation. This arrangement allows the ready and efficient movement of the extender between its various positions.

The invention also provides a method of forming a tailgate assembly for a motor vehicle. According to the invention methodology, an outer panel assembly is formed having an inboard face and an outboard face; an extender assembly is formed including an upper lateral structure; an inner panel member is formed having an inboard face, an outboard face, and guide structure defined between the inboard and outboard faces; the extender assembly is mounted on the inner panel with guide structure on the extender assembly coacting with the guide structure on the inner panel member to mount the extender assembly on the inner panel for movement between a stowed position in which the upper lateral structure of the extender assembly is proximate an upper edge of the inboard panel member and an extended position in which the upper lateral structure is spaced from the upper edge; the inboard face of the outer panel member is positioned proximate the inboard face of the inner panel member; and the inner panel member is attached to the outer panel member to define a completed tailgate assembly having inner and outer panel members and an extender assembly moveable between stowed and extended positions relative to the inner and outer panel members. This methodology provides an efficient and cost effective means of providing a tailgate assembly having an extender capability.

According to a further aspect of the invention the tailgate comprises a thick molded inner core member having an outboard face and an inboard face; an inner cover sheet secured to the inboard face of the core member; an outer cover sheet secured to the outboard face of the core member; laterally spaced vertically extending channels defined within the core member; and an extender assembly including a pair of laterally spaced post assemblies slidably positioned respectively in the channels in an upper bar structure interconnecting upper ends of the post assemblies. This construction enables the ready and efficient construction of a modular tailgate with an extender assembly.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIGS. 18, 19, 20 and 21 are detailed views of the tailgate of the second embodiment of the invention.

DESCRIPTION OF THE PREFERRED EMBODIMENTS

The invention will first be described with respect to the first embodiment of the invention tailgate shown in FIGS. 1–15 and will thereafter be described with respect to the second embodiment of the invention tailgate shown in FIGS. 16–21.

Figure 1:
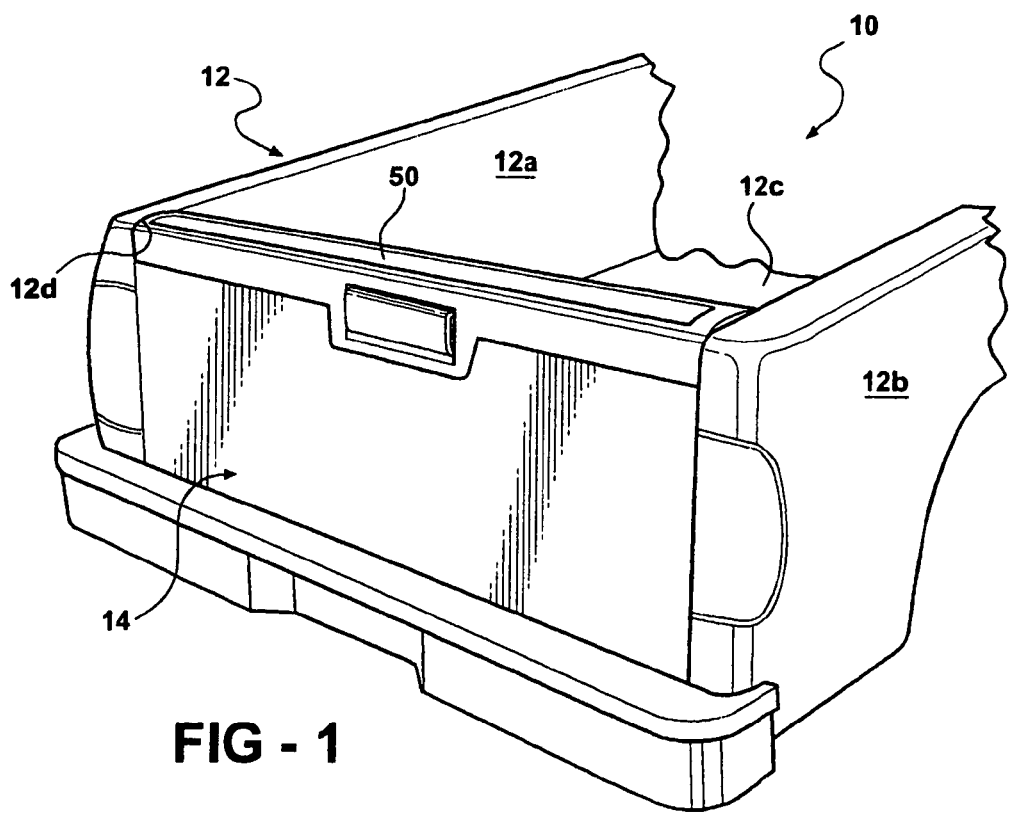
FIG. 1 is a fragmentary perspective view of a motor vehicle of the pickup type employing a tailgate according to a first embodiment of the invention.
Figure 2:
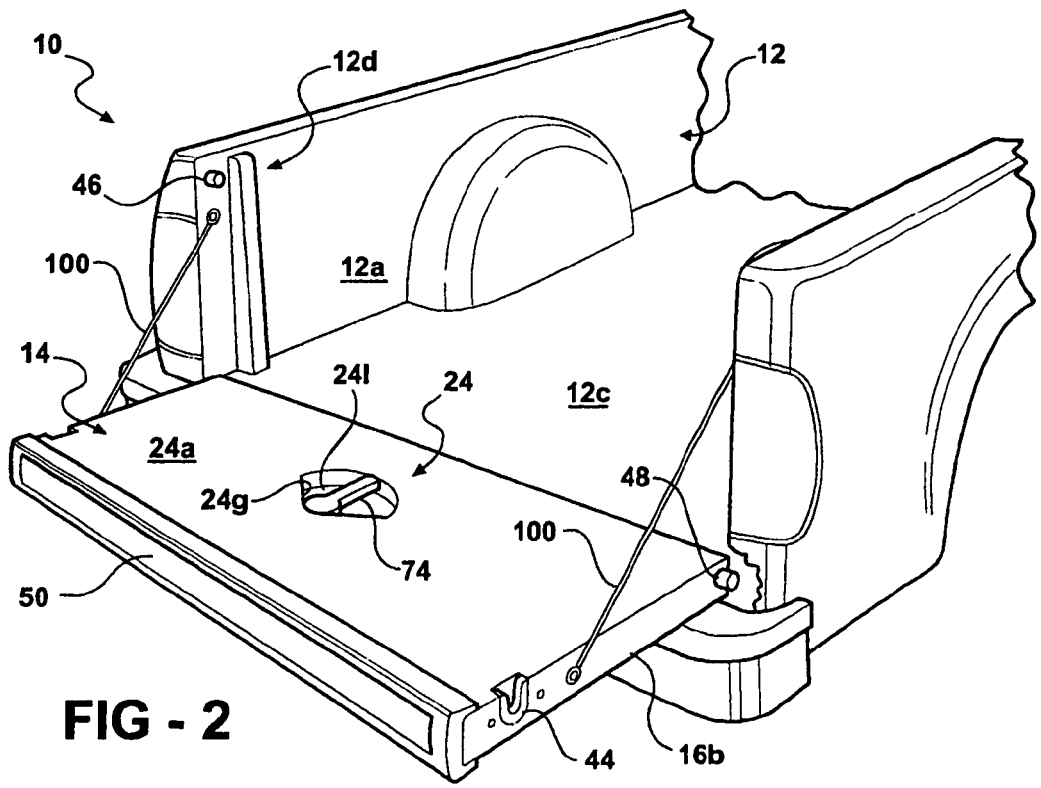
FIG. 2 is a view of the vehicle of FIG. 1 with the tailgate shown in a lowered position.
Figure 3:
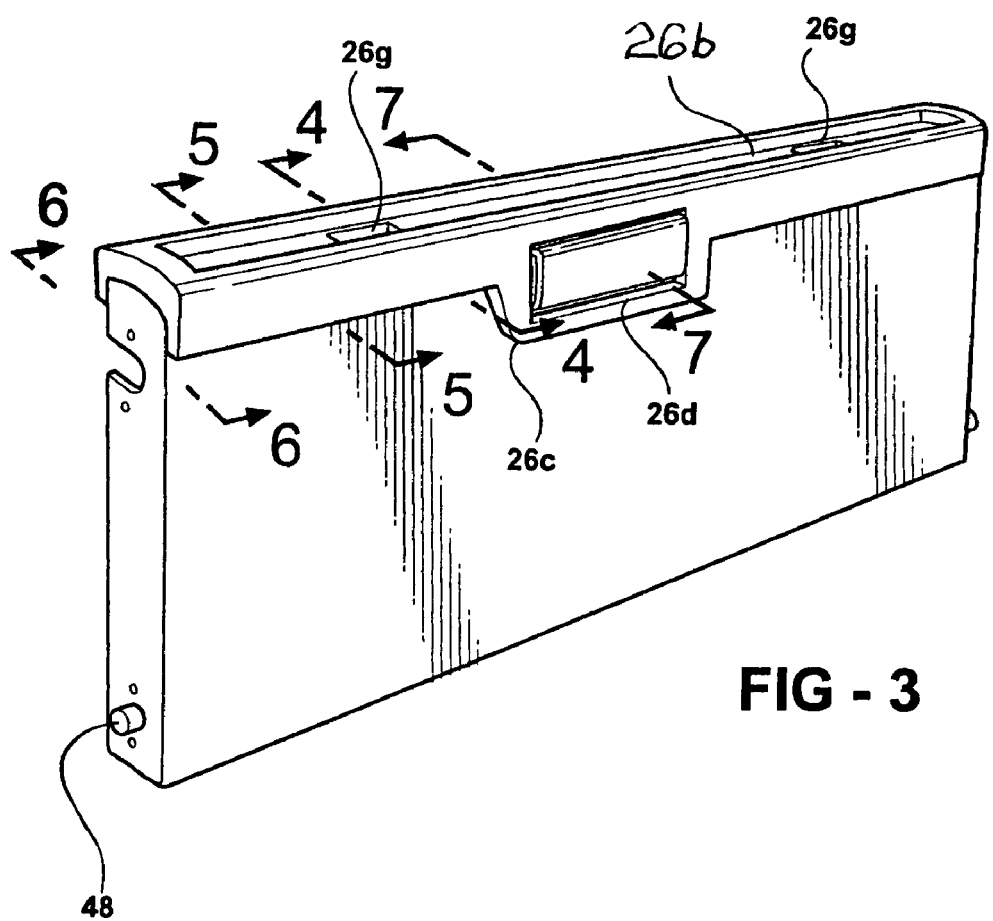
FIG. 3 is a perspective view of the tailgate.
Figure 4:
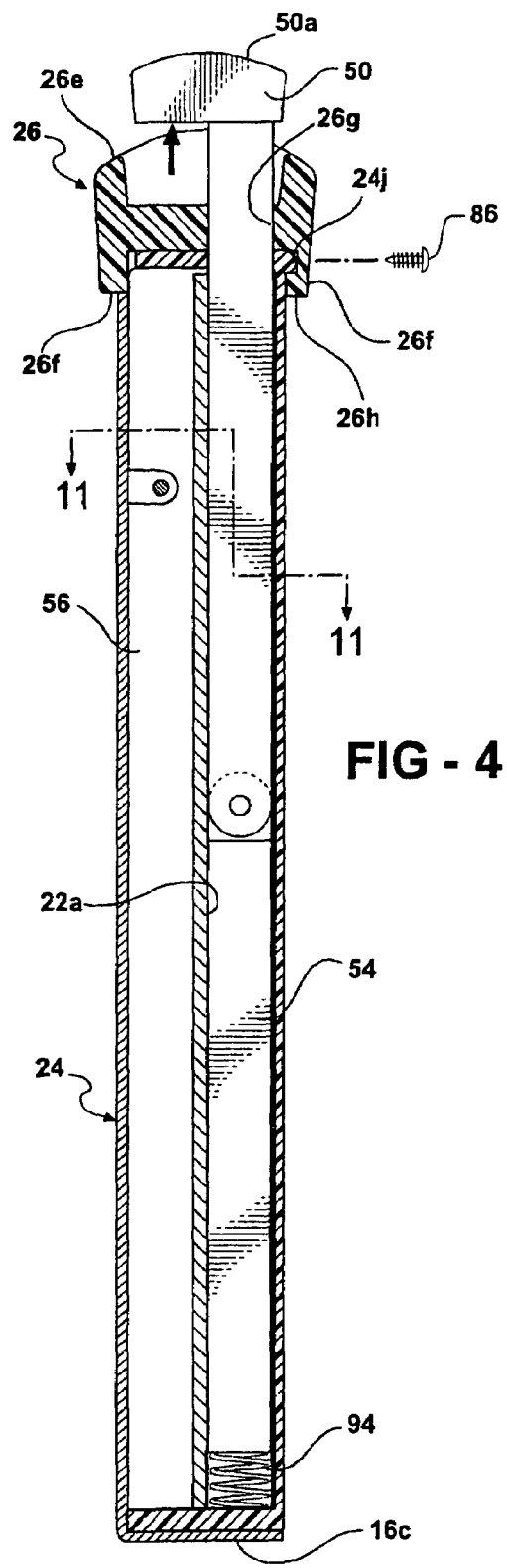
FIGS. 4, 5, 6 and 7 are cross-sectional views taken respectively on lines 4—4, 5—5, 6—6 and 7—7 of FIG. 3.
Figure 5:
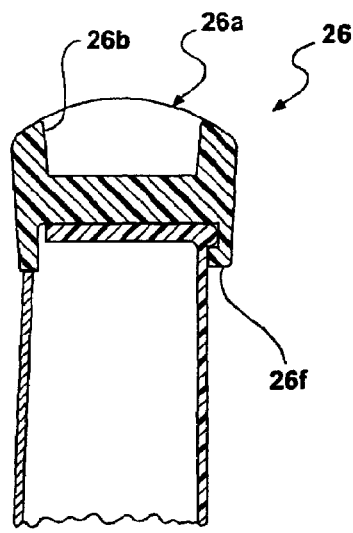
Figure 6:
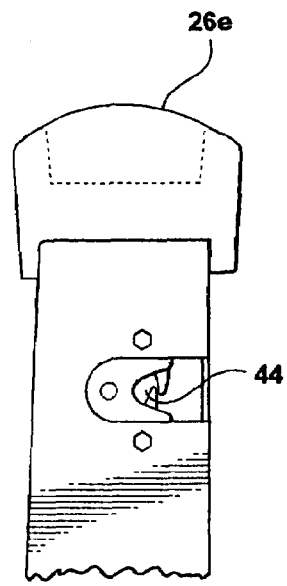
Figure 7:
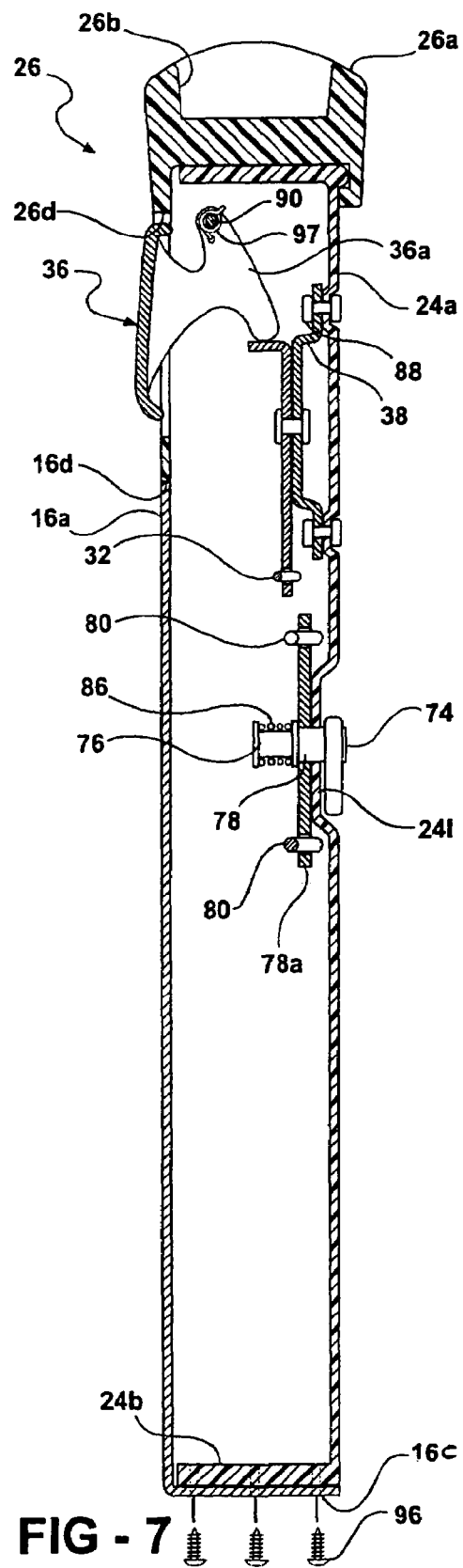
Figure 8:
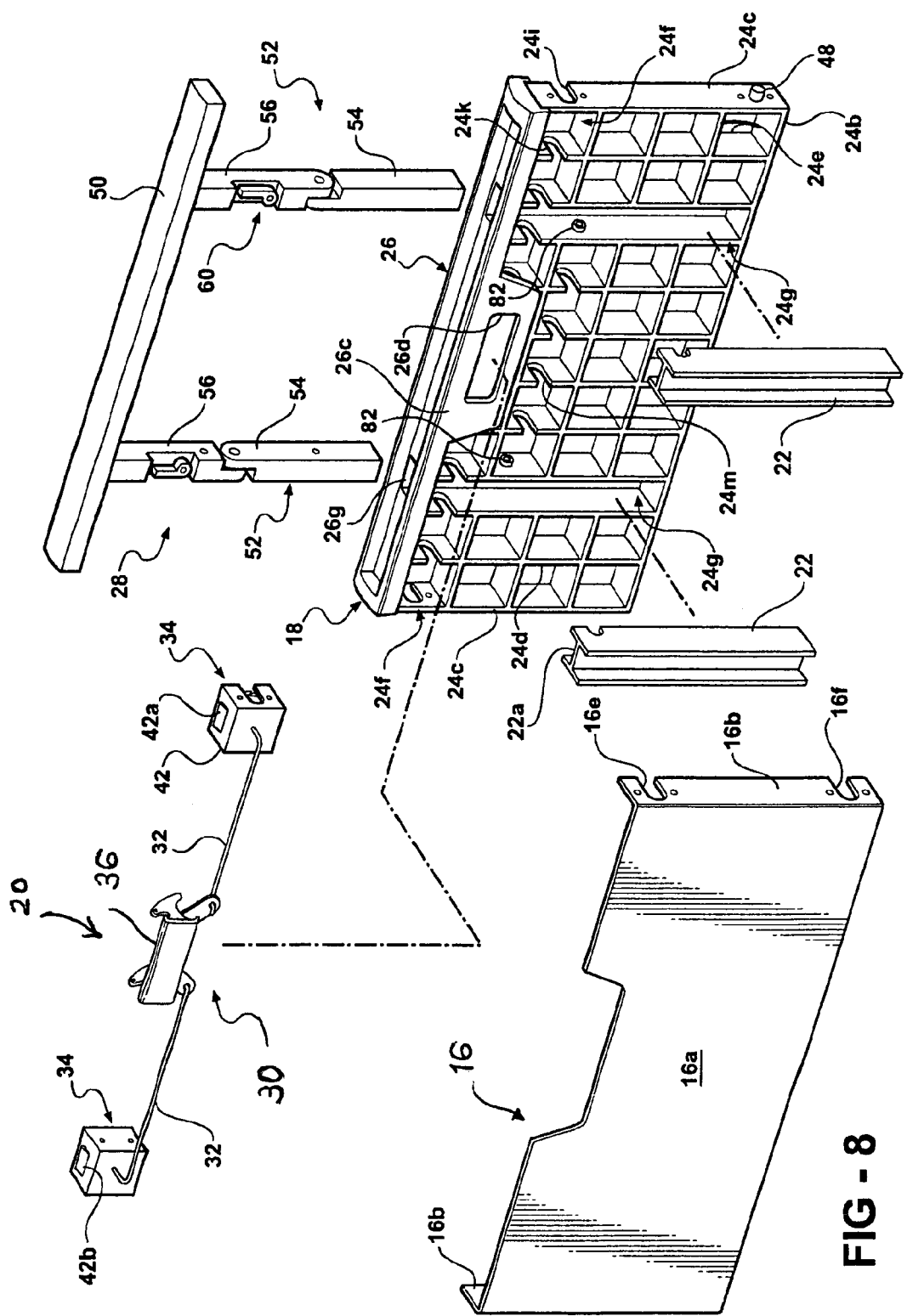
FIG. 8 is an exploded view of the tailgate.
Figures 9, 10:
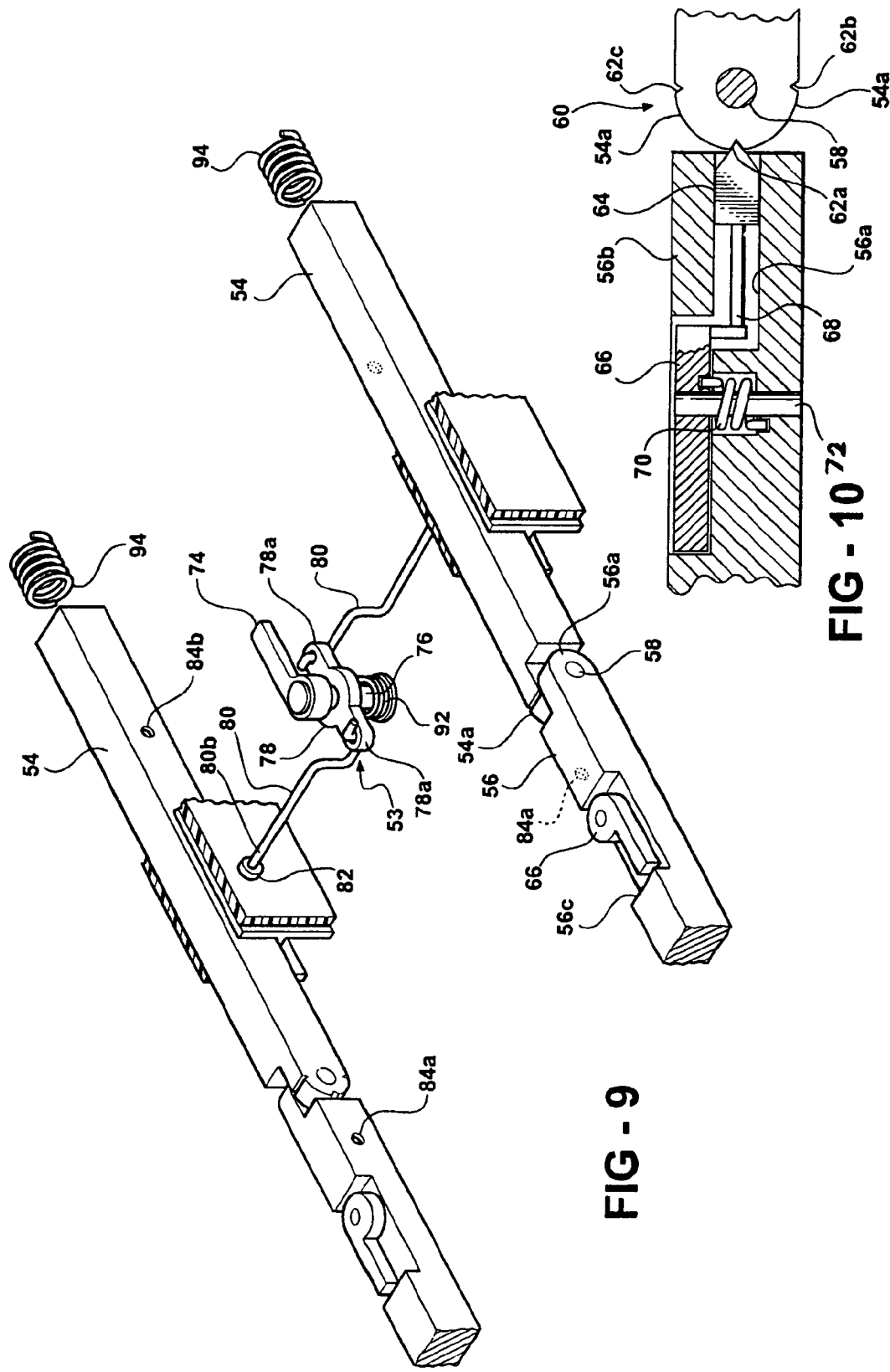
FIG. 9 is a fragmentary, perspective, somewhat schematic view illustrating the operation of an extender assembly of the tailgate.
FIG. 10 is a fragmentary somewhat schematic view illustrating a catch mechanism utilized in the tailgate assembly.
Figure 11:
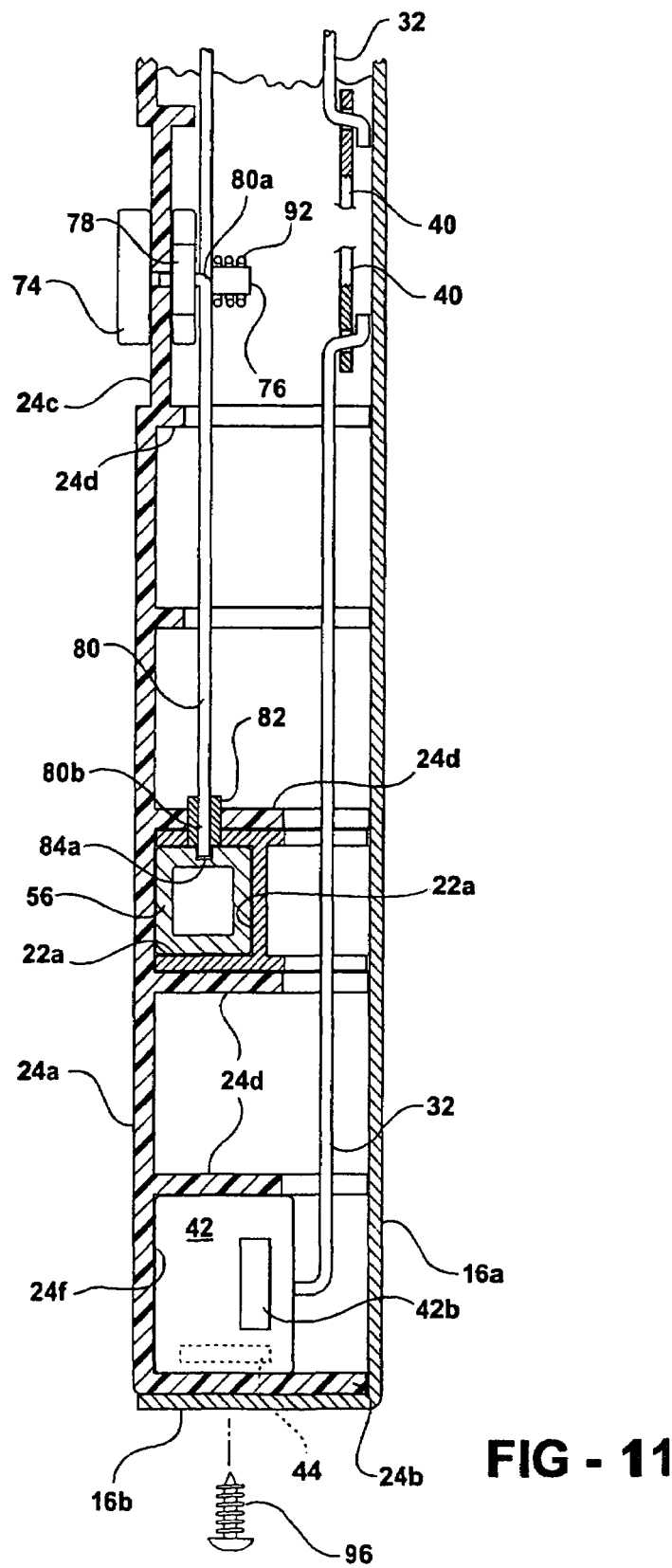
FIG. 11 is a cross-sectional view taken on line 11—11 of FIG. 4.
Figure 12:
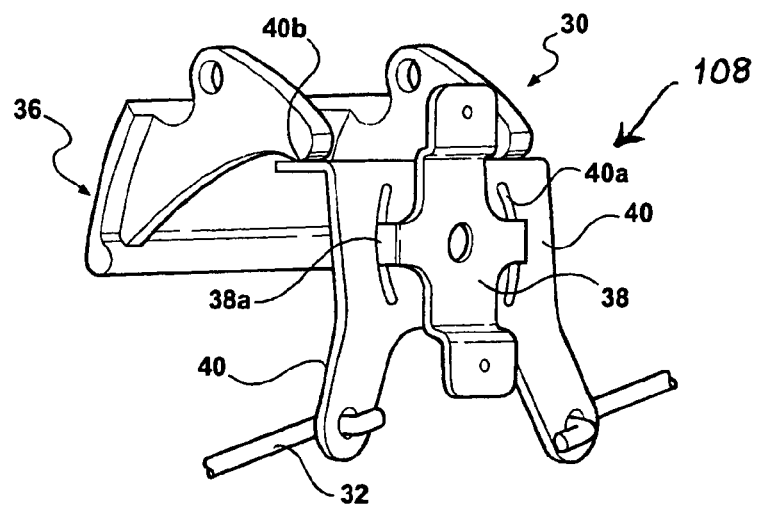
FIG. 12 is a perspective view of a handle assembly utilized in the tailgate.

The motor vehicle 10 seen fragmentarily in FIGS. 1 and 2 is of the pickup type and includes a cargo body 12 and a tailgate assembly 14.

Cargo body 12 includes sidewalls 12a and 12b and a floor 12c coacting at the rear of the cargo body to define a tailgate opening 12d.

Tailgate assembly 14, broadly considered, includes an outer panel 16 and an inner module 18.

Outer panel 16 is preferably formed as a sheet metal stamping and has a generally rectangular configuration including a main body planar portion 16a, side edge flanges 16b, and a lower flange 16c.

Inner module 18 includes an actuator assembly 20; a pair of channel members 22; a main body structure 24; a header 26; and an extender assembly 28.

Actuator assembly 20 includes a handle assembly 30, links 32, and latch devices 34.

Handle assembly 30 includes a handle 36, a bracket 38 having diametrically opposed arms 38a, and a pair of actuator levers 40 pivotally mounted on bracket 38 and each including an arcuate slot 40a slidingly and guidingly receiving a respective bracket arm 38a.

Each latch device 34 includes a generally rectangular housing 42 housing a latch mechanism of known form including a latch member 44 arranged for coaction in known manner with a striker 46 provided on a respective side wall of the cargo body to latch the tailgate in the vertical, closed position seen in FIG. 1 within the tailgate opening 12d in response to upward pivotal movement of the tailgate about hinge pins 48.

Channel members 22 are of known I-beam configuration and may be formed of either a metallic or a plastic material.

Main body structure 24 is formed in a plastic molding operation and has a honeycomb, generally rectangular configuration including a front wall 24a, a lower wall 24b, side edge walls 24c, laterally spaced vertical partition walls 24d, and vertically spaced horizontal partition walls 24e. The walls and partitions are configured to define a pair of pockets 24f sized to receive latch housings 42 with a press fit and a pair of vertically extending passages 24g sized to receive channel members 22 with a press fit.

Header 26 is formed in a plastic molding operation and includes a main body horizontal bar portion 26a defining an upwardly opening pocket 26b and a skirt portion 26c defining a generally rectangular opening 26d. The upper face 26e of bar portion 26a has an arcuate configuration.

Extender assembly 28 includes a horizontal bar 50, a pair of post assemblies 52 secured to laterally spaced points on bar 50, and an extender release assembly 53.

Bar 50 has a length and cross-sectional configuration sized to nest within the pocket 26b of header bar portion 26a and presents an arcuate upper face 50a blending smoothly with the arcuate upper face 26e of the header bar portion.

Each post assembly 52 includes a lower post 54, an upper post 56, and a catch mechanism 60. An upper lug 54a of lower post 54 is pivotally connected to a lower lug 56a of upper post 56 by a pivot pin 58 whereby to articulate the upper post relative to the lower post. Post members 54 and 56 have a rectangular tubular configuration and are sized to fit slidably in the forward pocket 22a defined by a respective channel member 22.

Catch mechanism 60 includes a plurality of circumferentially spaced notches 62a, 62b, 62c provided in the upper lug 54a of the lower post member 54, a plunger 64 slidably mounted in a passage 56a provided in the lower end of the upper post member, a catch handle 66 pivotally mounted in a pocket 56c in the upper post member above the pivot pin 58, and a link or cable 68 interconnecting the plunger 64 and the handle 66 so that plunger 64 is moveable in and out of engagement with a respective notch 62 in response to pivotal movement of the catch handle 66 with the mechanism biased to an engaged position by a coil spring 70 encircling the pivot pin 72 of the catch handle 66.

Extender release assembly 53 includes a handle 74 received in a fan shaped recess 24g in the rear face of the front panel 24a of the main body structure 24, a shaft 76 extending from one end of handle 74 and suitably pivotally mounted in the main body structure 24, an actuator 78 fixedly secured to shaft 76 and including upper and lower ears 78a, and a pair of links 80 respectively mounted at their inboard ends 80a in slots in upper and lower ears 78a of actuator 78 and slidably received at their outboard ends 80b in sleeves 82, positioned in a sidewall of the respective channel member 22 and a proximate partition wall 24d, and extending into a respective pocket 22a for coaction with upper sockets 84a provided in the upper post 56 and lower sockets 84b provided in the lower post 54.

ASSEMBLY

To assemble the tailgate assembly of the invention, header 26 is positioned over the upper edge of the main body structure 24 utilizing a snap fit of a lip 26f of the header over a bead 24j formed along an upper edge of the main body structure 24 in combination with suitable fasteners 86 passing through a rear lip 26g of the header for engagement with the main body structure 24; handle assembly bracket 38, carrying actuator levers 40, is fixedly secured to the rear face of the front wall 24a of main body structure 24 utilizing fasteners 88; crank arm portions 36a of handle 36 are pivotally secured by pins 90 to main body structure 24 with free ends 36b of the crank arms bearing against upper ends 40b of the actuator levers and handle 36 positioned in header opening 26d; links 32 are suitably passed through notches 24k provided in the vertical partition walls 24d of main body structure 24; latch device housings 42 are positioned with a press fit in pockets 24f utilizing snap structures 42b on the top walls of the latch device housings coacting with suitable detent structures in the pockets 24f to temporarily maintain the latch devices in the pockets 24f; extender release assembly 53 is mounted on the main body structure 24 with shaft 76 passing through an aperture in the recessed wall portion 24l defining recess 24g, handle 74 positioned in recess 24g, actuator 78 positioned rearwardly of wall portion 24l, links 80 passing through notches 24m in partition walls 24d and slidably positioned at their outboard ends 80b in sleeves 82, and a coil spring 92 encircling shaft 76 and arranged to bias actuator 78 in a direction to move links 80 outboard; extender assembly 28 is mounted to main body structure 24 by passing the lower ends of post assemblies 52 downwardly through laterally spaced apertures 26g in header 26 and into the respective pockets 22a defined by channel members 22 to compress springs 94 positioned at the bottoms of the pockets and snap the outboard ends 80b of links 80 into upper sockets 84a in upper post 56 with bar 50 seating in pocket 26b; outer panel 16 is positioned against the rear face of main body structure 24 with side flanges 16b positioned against main body structure side edge walls 24c, lower flange 16c positioned beneath main body structure lower wall 24b, upper edge 16d abutting against the lower edge 26h of header 26, and a cut out 16d in the outer panel receiving the skirt portion 26c of the header; and the outer panel is secured to the main body structure 24 by passing fasteners 96 through suitable apertures in side flanges 16b and lower flange 16c into main body structure 24 with the fasteners 96 proximate latch devices 34 comprising bolts arranged to pass through the main body structure and into threaded apertures 42a in the latch housings 42 to fixedly secure the latch devices to the main body structure.

Note that in the completed tailgate assembly a notch 24i in each side wall 24c aligns with a notch 16e in an outer panel side edge flange 16b to allow access of strikers 46 to latch members 44 as the tailgate is moved to a closed, latched position. Note further that each pivot pin 48 is carried by a main body structure sidewall 24c and passes outwardly through a notch 16f in outer panel side edge flange 16b. Pivot pins 48 may be formed as molded portions of the main body structure or may comprise separate elements secured to the sidewalls of the main body structure.

OPERATION

The normal closed and latched position of the tailgate is seen in FIG. 1. In order to move the tailgate to a lowered position, handle 36 is grasped and pivoted outwardly against the bias of a return spring 97 to pivot actuator levers 40 and trip latch members 44 via links 32 to release the gate from the strikers 46 and allow the gate to be lowered about the axes of pivot pins 48 to a lowered position with the extent of lowering controlled in known manner by cables 100.

If it is desired to utilize the extender assembly, release handle 74 is rotated to withdraw the outboard ends 80b of links 80 from upper sockets 84a whereby to release the post assemblies and allow the extender assembly to be moved outwardly under the urging of compressed springs 94. The various parameters are chosen such that the springs have the effect of moving the bar 50 of the extender assembly upwardly or outwardly from the header 26 only a sufficient distance to allow the bar 50 to be grasped by the user whereafter the extender assembly may be moved manually further outwardly until the outboard ends 80b of the links 80 snap into the lower sockets 84b at which point the pivot pins 58 are just clear of the upper edge of the header. The extender assembly and tailgate are now in the positions seen in FIG. 13 wherein the extender assembly serves as an extension of the tailgate assembly to allow additional support for elongated cargo such as the lumber seen in FIG. 13. The extender assembly may be moved to the positions seen in FIGS. 14 and 15 by manipulation of the levers 66 to withdraw the plungers 64 from the notches 62a corresponding to the FIG. 13 position. To move the extender assembly to the FIG. 14 position, the extender assembly is rotated downwardly until the plungers reach and move into the lower notches 62b corresponding to the downwardly extending position seen in FIG. 14. In this position the bar 50 serves as a step to assist entry into the bed of the pickup truck. To move the extender assembly to the FIG. 15 position, the extender assembly is rotated upwardly until the plungers 64 reach and move into the upper notches 62c corresponding to the upwardly extending position seen in FIG. 15. In this position the upwardly extending post assemblies and the bar 50 coact to preclude rearward movement of cargo positioned on the floor of the pickup truck.

To restore the extender assembly to its stowed position, the levers 66 are rotated to allow the outer post members to be moved to a position of alignment with the inner post members as defined by engagement of the plungers 64 with the notches 62a, whereafter the handle 74 is rotated in a direction to withdraw the links 80 from the lower sockets 84b to allow the extender to be pushed manually inwardly against the bias of springs 94 until the outboard ends 80b of the links 80 snap into coaction with the upper sockets 84a at which time the bar 50 has moved back into seating, nesting engagement with the pocket 26b and the extender assembly has returned to its stowed position whereafter the tailgate, if desired, may be rotated upwardly to its closed and latched position.

The second embodiment of the tailgate will now be described with reference to FIGS. 16–21.

Figure 16:
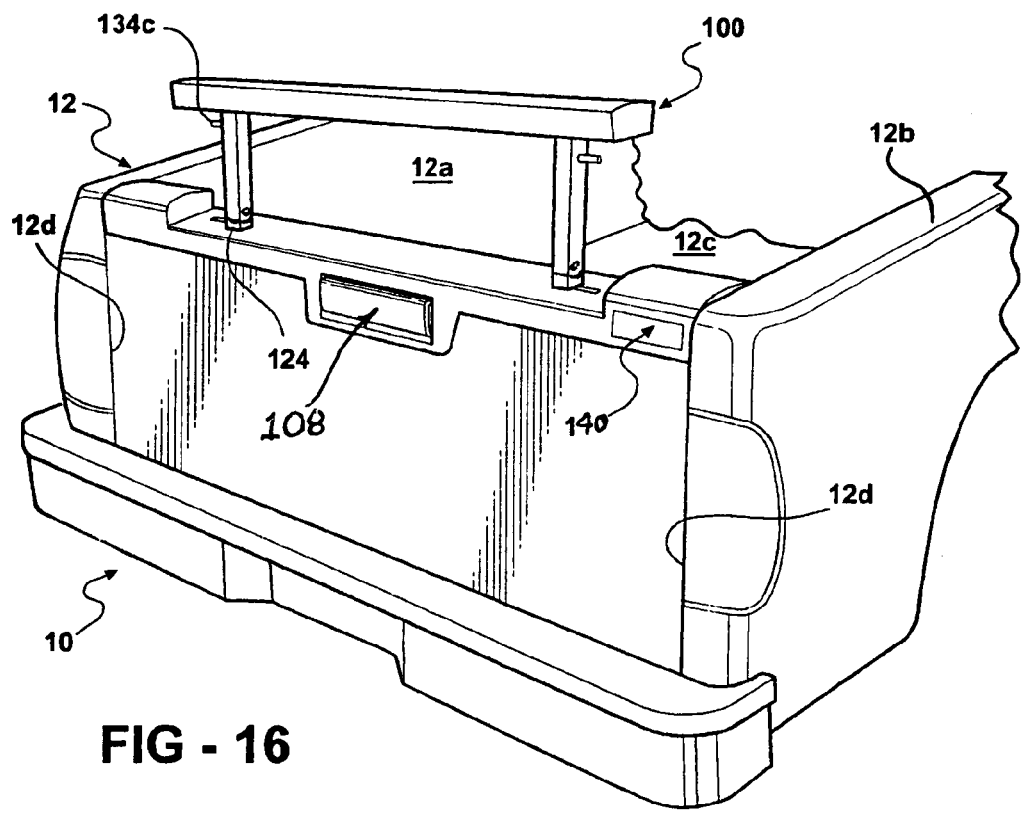
FIG. 16 is a fragmentary perspective view of a motor vehicle of the pickup type employing a tailgate according to a second embodiment of the invention.
Figure 13:
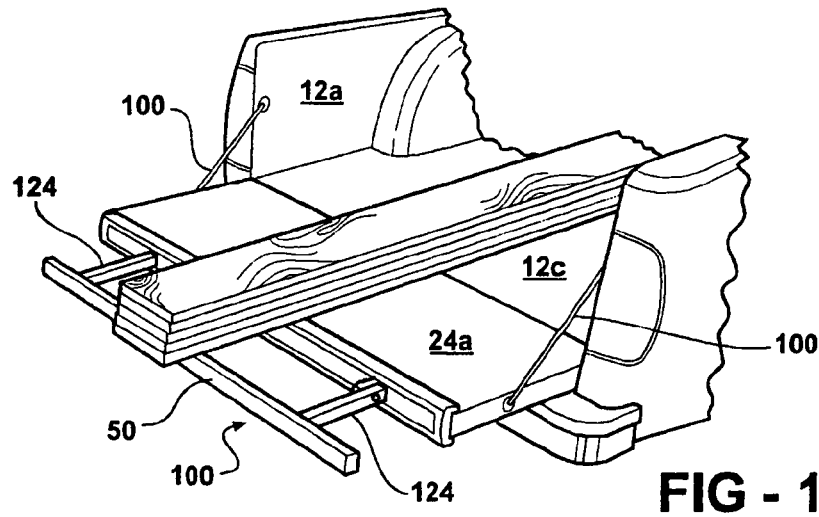
FIGS. 13, 14 and 15 are fragmentary views showing the tailgate in a lowered position with the extender assembly configured to address varying load requirements.
Figure 14:
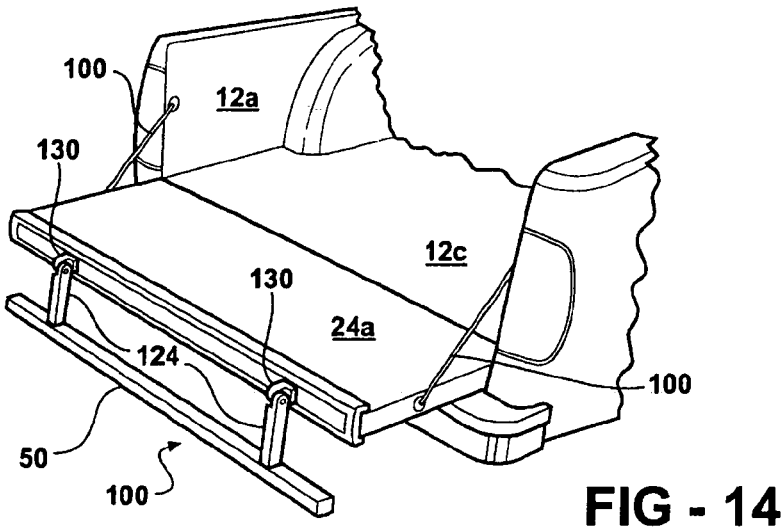
Figure 15:
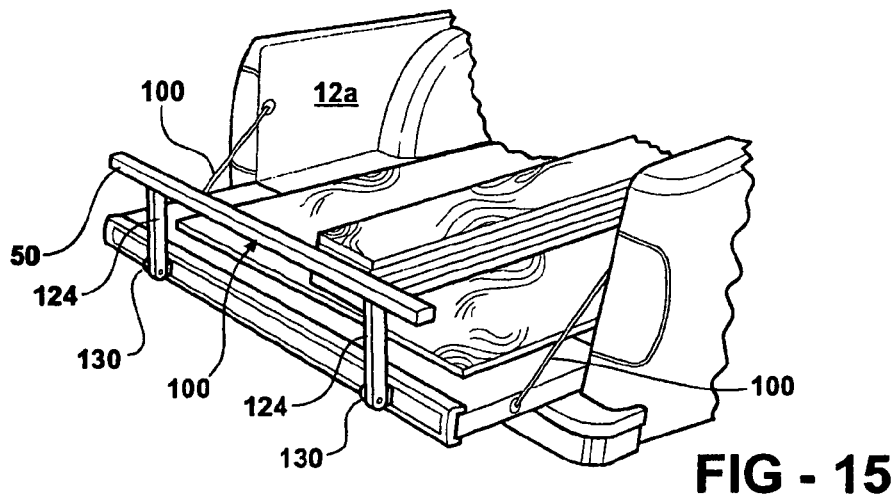
Figure 17:
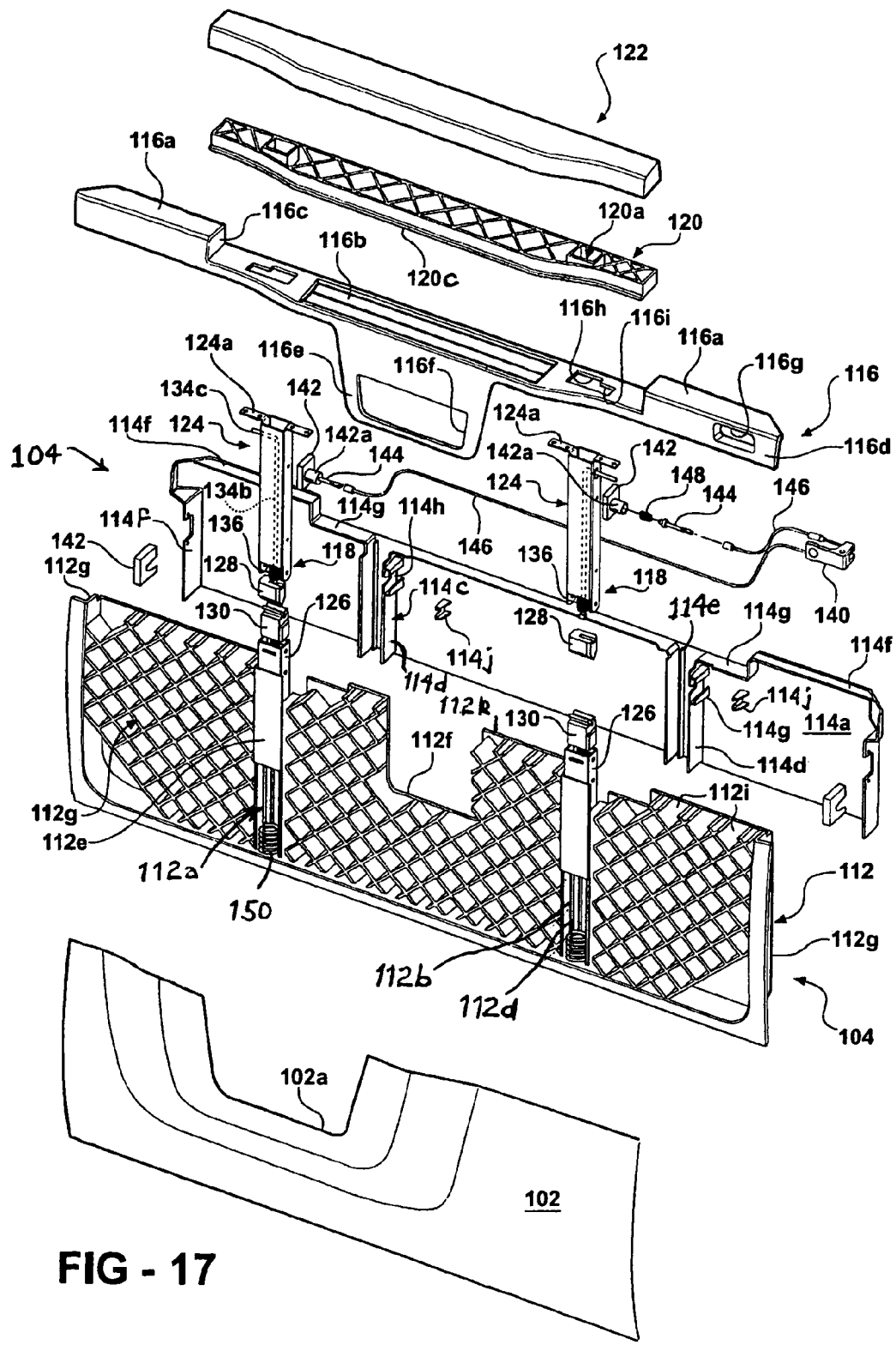
FIG. 17 is an exploded perspective view of the tailgate of the second embodiment of the invention.
Figure 18:
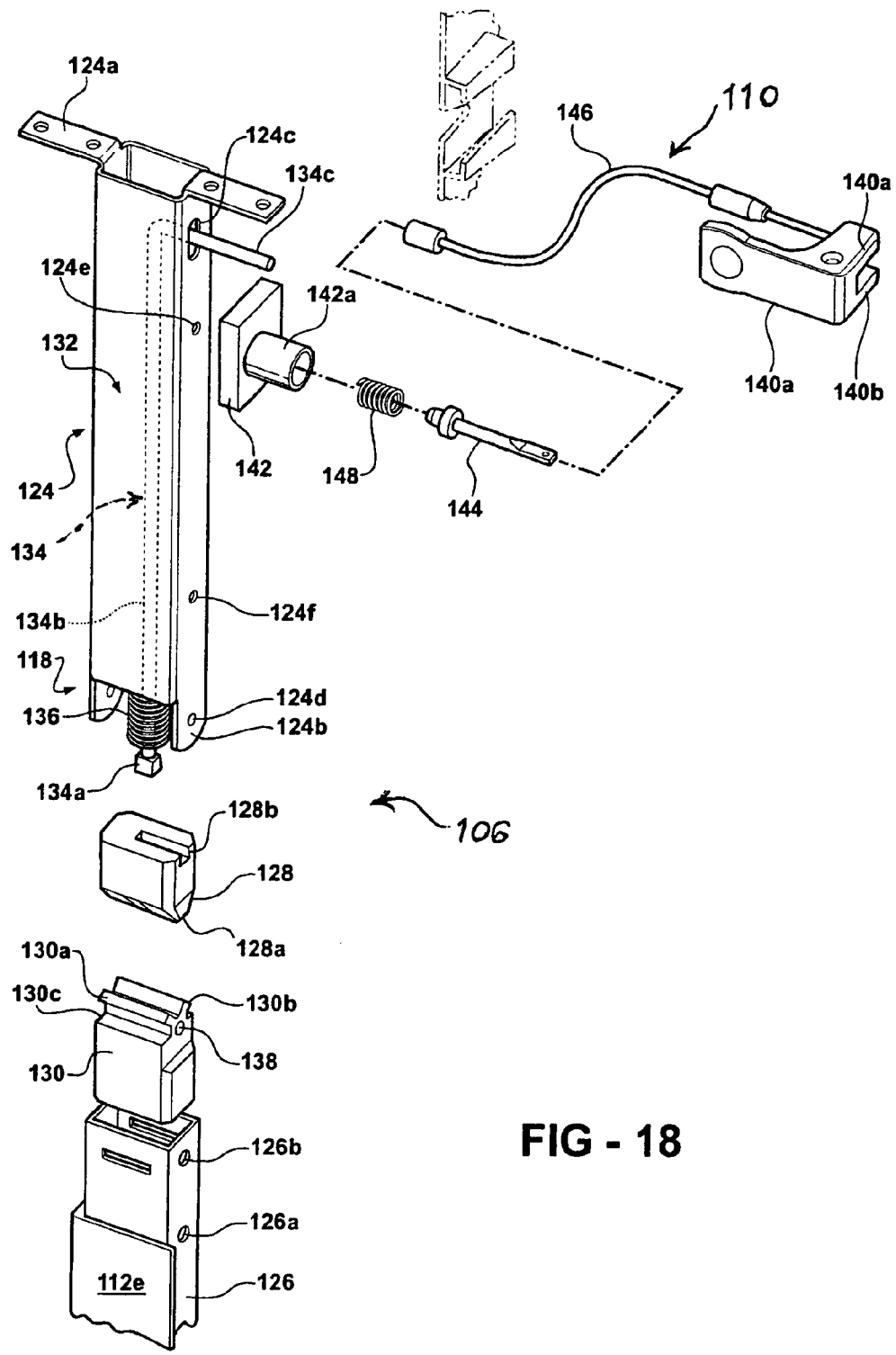
Figure 19:
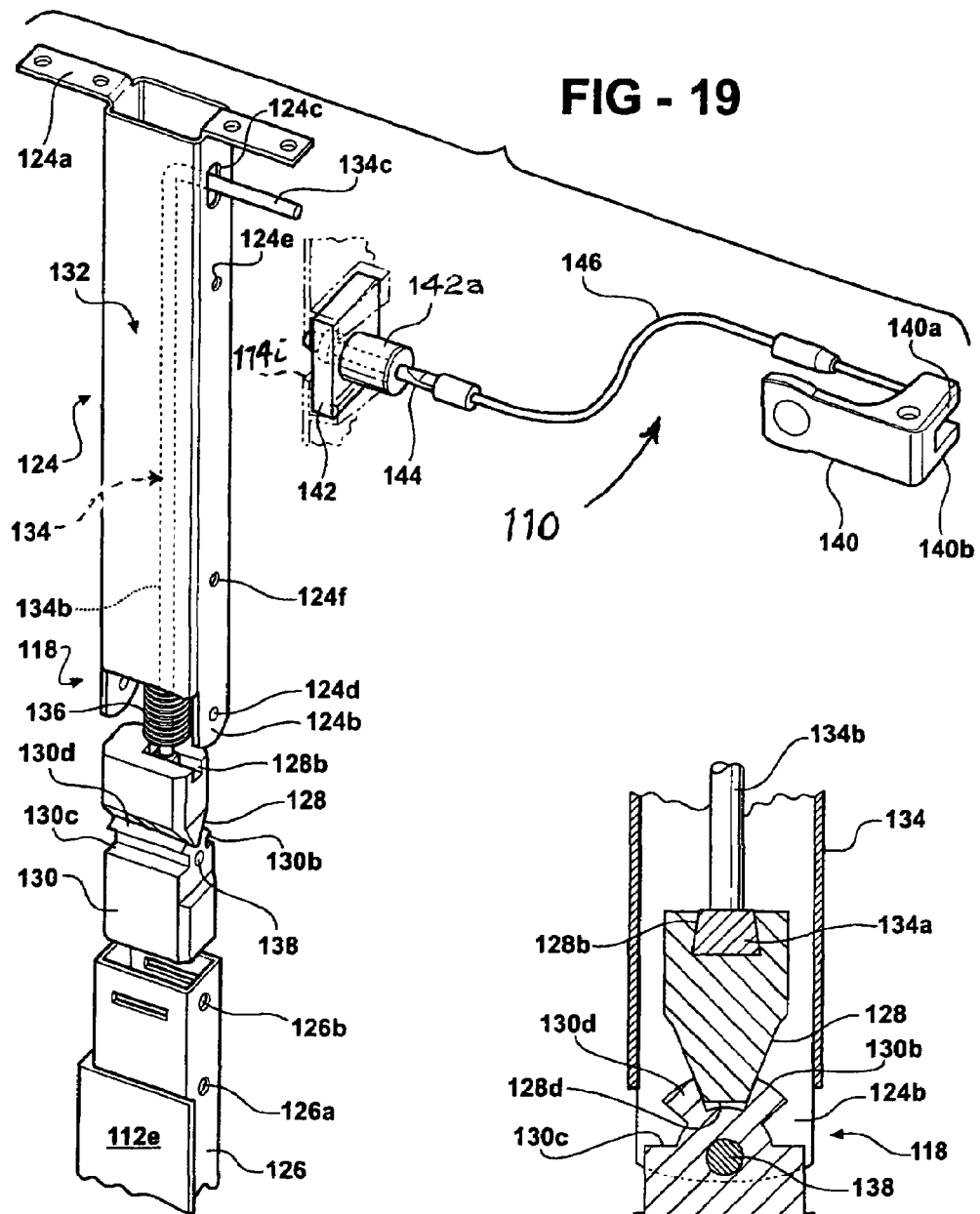
Figure 20:
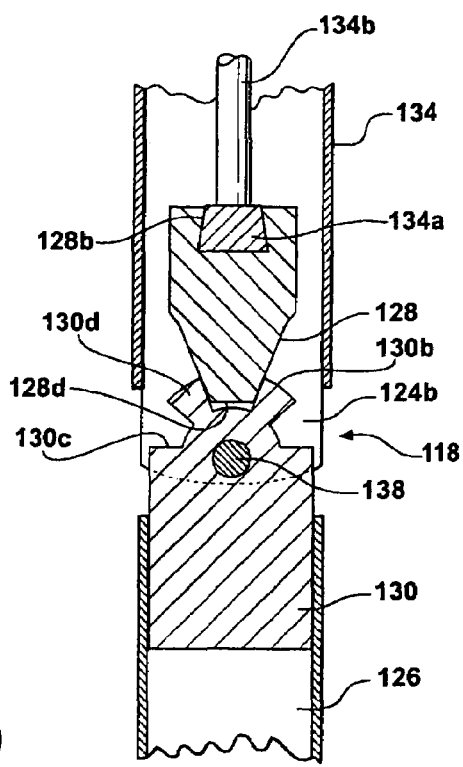

The motor vehicle 10 seen fragmentarily in FIG. 16 is of the pickup type and includes a cargo body 12 and a tailgate assembly 100.

Cargo body 12 includes sidewalls 12a and 12b and a floor 12c coacting at the rear of the cargo body to define a tailgate opening 12d.

Tailgate assembly 100, broadly considered, includes an outer cover sheet 102, an inner panel assembly 104, an extender assembly 106, a gate release assembly 108 and an extender release assembly 110.

Outer cover sheet 102 has a generally planar thin sheet configuration, defines a gate release latch opening pocket 102a and may be formed of a suitable plastic material.

Inner panel assembly 104 includes a core member 112, an inner cover sheet 114, and a top cap 116.

Core member 112 is formed as a molded plastic member and has a thick rectangular honeycomb construction. Core member 112 defines a pair of vertical channel structures 112a with each channel structure comprising sidewalls 112b, a front wall, guide ribs 112d, and a partial rear wall 112e. Core member 112 further defines a central latch opening 112f and honeycomb main body structure 112g.

Inner cover sheet 114 may be formed as a molded plastic material, has a generally rectangular thin sheet configuration, and is intended to cover the upper half of core member 112. Cover sheet 114 includes a main body portion 114a, end flanges 114b, and spaced channel structures 114c. Each channel structure 114c includes side walls 114d and ribs 114e. Cover sheet 114 is secured to the upper front half of core member 112 using mechanical fastening devices with end flanges 114f positioned against end surfaces 112g of the core member, main body 114a fitted flush against the upper rear wall 112i of core member 112, channel sidewalls 114d fitted within upper channel sidewalls 112b, and ribs 114e forming an upward extension of ribs 112d, whereby the core member and the inner cover sheet coact to define a pair of channels extending for the full height of the gate inner panel and defined by sidewalls 112b, 114d; ribs 112d, 114e; and rear wall 112e. Cover sheet 114 further includes upper end flanges 114f extending rearwardly over upper end edges 112i of the core members and a central upper flange 114g extending rearwardly over a central upper edge 112k of the core member.

Top cap 116 is formed as a molded plastic member and includes end top walls 116a, a central top wall 116b, shoulders 116c interconnecting central top wall 116b and end top walls 116a, and a rear wall 116d including a downstanding central tongue portion 116e sized to fit in outer panel central opening 102a. A central rectangular aperture 116f is provided in tongue portion 116e and a rectangular rearwardly opening pocket 116g is provided in rear wall 116d proximate one end of the top cap.

Top cap 116 is secured to inner cover 114 and to core member 112 by cementing end top walls 116a to end top walls 114f with rear wall 116b extending downwardly over the rear upper face of core member 112 for coaction at its lower edge 116h with an upper flange 102b on outer panel 102, tongue portion 116e nesting downwardly into pocket 102a, and pocket 116g positioned in a pocket 112l provided in the rear face of the core member. Mechanical fastening devices may also be employed to secure top cap 116 to inner cover 114.

Extender assembly 106 includes a pair of post assemblies 118, an extender top support 120, and an extender cap 122.

Each post assembly 118 includes an upper extender arm 124, a lower extender arm 126, an upper extender joint 128, a lower extender joint 130, and an extender joint release mechanism 132.

Upper extender arm 124 has a tubular rectangular configuration including upper attachment flange ears 124a and lower pivot lugs 124b.

Lower extender arm 126 has a tubular rectangular configuration corresponding to the configuration of the upper extender arm.

Upper extender joint 128 has a rectangular cross-sectional configuration, is sized to fit slidably in the lower end of upper extender arm 118, and includes spaced wedge members 128a on its lower face.

Lower extender joint 130 has a rectangular cross-sectional configuration, is sized to fit telescopically in the upper end of the lower extender arm 126, and defines angularly spaced sets of wedge notches 130a, 130b, and 130c sized to selectively receive wedge members 128a.

Extender joint release mechanism 132 includes an "L" shaped rod 134 and a spring 136.

In assembled relation of each post assembly, the lower extender joint 130 is positioned in the upper end of the lower extender arm and held in place therein as by crimping; a dovetailed lower end 134a of rod 134 is slidably received in a dovetailed slot 128b defined in the upper face of upper extender joint 128; spring 136 is positioned in the lower end of upper extender arm 124; the vertical portion 134b of rod 134 extends upwardly through spring 136 within the hollow of upper extender arm 124, and the horizontal leg 134c of the arm extends outwardly through a slot 124c in the sidewall at the upper end of upper extender arm 124; and a pivot pin 138 passes through apertures 124d in lugs 124b, through apertures 126b in the upper end of the lower extender arm, and through a suitable bore in lower extender joint 130 to pivotally interconnect the upper and lower extender arms with the wedge members 128 being pressed into coaction with a selected pair of wedge notches 130a, 130b or 130c via the spring 136.

Extender top support 120 has a molded, honeycomb configuration and defines a pair of vertical passages 120a and a plurality of upwardly opening threaded sockets 120b flanking the passages 120a.

Extender cap 122 is also formed as a molded member and has a hollow, downwardly opening cross sectional configuration sized to snap into place over extender top support 120, utilizing latch members 122a coacting with a lip 120c, in order to complete the extender assembly 106. Post assemblies 118 are passed downwardly through passages 120a in top support 120 to position flange ears 124a over lugs 120b whereafter suitable fasteners are employed to secure the post assemblies to the extender top support whereafter the extender cap 122 is snapped in place over the extender top support to complete the extender assembly and form an upper bar structure for the extender assembly.

Gate release assembly 108 is similar to the gate release assembly described with respect to the first embodiment of the invention and includes a handle 32, positionable within latch openings 116f, 112f and 102a, and latches 142 interconnected to the handle in known manner by link means (not shown) passing through the core member. Latches 142 are suitably positioned proximate the side edges of the inner panel assembly in pockets defined within the honeycomb structure of core member 112 and coact in known manner with strikers carried by the cargo body of the pickup truck proximate the tailgate opening.

Extender release assembly 110 includes a handle 140, extender pin housings 142, extender pins 144, and extender cables 146.

Handle 140 is fitted within the pocket 116g of top cap 116 and extender pin housings 142 are received in grooves 114h defined proximate the upper sidewalls 114d of the gate inner cover by opposed "L" shaped lugs 114g.

Pins 144 are slidably received in fittings 142a defined by extender pin housings 142. With the extender pin housings received in grooves 114h and pins 144 slidably received in fittings 142a, the pins have access to selected apertures in the post assemblies via cut outs 114i in sidewalls 114d. Cables 146 are secured at one end to a respective pin 144, are secured at the other end to one of a set of bifurcated arms 140a, 140b defined by handle 140, and pass intermediate their ends through core member 112. Handle 140 is suitably pivotally mounted in pocket 116g whereby inward pivotal movement of the handle 140 has the effect of pulling on the cables 146 and pulling outwardly on the respective pins 144 to draw them outwardly relative to their respective fittings 142a against the resistance of return springs 148 positioned in the respective fittings 142a in surrounding relation to the respective pins. A pair of cable guides 114j extend rearwardly from the main body 114a of cover sheet 114 proximate each groove 114h to guide the respective cables 146.

Following the assembly of the inner and outer panels of the tailgate, and assembly of the extender assembly, the extender assembly may be attached to the tailgate by passing the post assemblies 118 downwardly through the openings 116h in top cap central top wall 116b to pass the post assemblies downwardly into the channels defined by the inner panel assembly and press the lower ends of the post assemblies against coil springs 150 positioned in the core member 112 proximate the lower ends of the channels with the horizontal arm portions 134c of the extender joint release rods 134 passing downwardly through lateral enlargements 116i of the openings 116h.

With the extender assembly in its fully lowered position with the upper bar structure 120/122 nested in pocket defined by the top cap surfaces 116b and 116c, pins 144 are urged outwardly by springs 148 into coaction with apertures 124e in the upper side walls of upper extender arm uppers 124 to maintain the extender in its fully lowered position against the bias of springs 150.

When it is desired to raise the extender assembly, handle 140 is pivoted inwardly to pull pins 144 outwardly and allow the springs 150 to urge the extender assembly upwardly by a sufficient distance to move the horizontal arm portions 134c of the extender joint release rods 134 above the upper face 116b of the top cap 116 and provide a space between the surface 116b and the extender top cap to allow the extended top cap to be readily grasped by an operator to pull the extender further upwardly. If the handle 140 is not depressed the upward movement of the extender cap will terminate with the entry of the pins 144 into the apertures 124f in the sidewalls of the upper extender arms to define an intermediate raised position of the extender. If it is desired to raise the extender further, the handle 140 may be depressed to release the pins 144 from the apertures 124f and allow further upward movement of the post assemblies until the pins 144 engage the apertures 126a in the upper sidewall of the lower extender arm lower 126. At this point the joint between the upper and lower extender arms has been moved above the surface 116b so that, if desired, the horizontal portions 134c of the extender joint release rods may be raised within slots 124c against the bias of springs 136 to move the upper extender joints away from the lower extender joints and allow the upper extender arms and the extender cap to be pivoted relative to the lower extender arms. If the gate is in the upright or closed position seen in FIG. 16, the pivotal movement of the upper arms relative to the lower arms will amount to forward or rearward movement. If the gate is in a lowered position, the pivotal movement of the upper arms relative to the lower arms will amount to an upward or downward movement, all as described previously with respect to the FIGS. 1–15 embodiment. It will be understood that as the upper arms reach their forward or raised position relative to the lower arms, the wedge members 128a will coact with the wedge notches 130b to fixedly secure the upper members relative to the lower members in the forward or raised position and as the upper arms reach their rearward or lowered position relative to the lower arms the wedge members 128a will coact with the wedge notches 130c to fixedly secure the upper members relative to the lower members in the rearward or lowered position.

The tailgate assemblies of the invention will be seen to provide an arrangement whereby the tailgate can be readily configured to accommodate various load constraint requirements and can further be readily configured to facilitate entry into the cargo body of the vehicle. Further, the invention methodology and apparatus will be seen to significantly reduce the cost of producing a pickup tailgate incorporating an extender feature. Specifically the cost of tooling and fabricating the typical metal tailgate is significantly reduced by utilizing the preassembled and pre-dressed molded inner module, and the labor cost of assembling the tailgate is also significantly reduced.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A tailgate module for combination with a tailgate outer panel assembly to form a tailgate, characterized in that:
the module includes a thick inner core member and an extender assembly mounted on the inner core member and including an upper lateral structure moveable between a stowed position proximate an upper edge of the inner core member and an extended position spaced from the upper edge, the inner core member defining a pair of laterally spaced vertically extending channels within the core member;
the upper lateral structure comprising a bar; and
the extender assembly further including a pair of laterally spaced post assemblies secured at their upper ends to laterally spaced points on the bar and respectively slidably received in the channels.

2. A tailgate module according to claim 1 wherein:
the inner core member comprises a molded plastic member;
the extender assembly is further moveable to a displaced position removed from the plane of the tailgate;
each post assembly includes a lower post member articulated to an upper post member connected to the bar; and
the axes of articulation are positioned above the upper edge of the main body structure with the bar in its extended position whereby to allow the bar to be moved from its extended position to its displaced position by pivotal movement of the upper post members and the bar about the axes of articulation.

3. A tailgate module according to claim 2 wherein:
the module further includes catch means selectively operable to fixedly but releasably secure the bar in its stowed position, in its extended position, and in its displaced position.

4. A module according to claim 3 wherein the catch means comprise coacting catch devices on each post assembly proximate the axis of articulation.

5. A method of forming a tailgate assembly for a motor vehicle comprising the steps of:
forming an outer panel member having an inboard face and an outboard face;

forming an extender assembly including an upper lateral structure;

forming an inner panel member having an inboard face, an outboard face, and a guide structure defined between the inboard and outboard faces;

mounting the extender assembly on the inner panel member with guide structure on the extender assembly coacting with the guide structure on the inner panel member to mount the extender assembly on the inner panel for movement between a stowed position in which the upper lateral structure of the extender assembly is proximate an upper edge of the inner panel member and an extended position in which the upper lateral structure is spaced from the upper edge;

positioning the inboard face of the outer panel member proximate the outboard face of the inner panel member; and attaching the inner panel member to the outer panel member to define the tailgate assembly having the inner and outer panel members and the extender assembly moveable between the stowed and extended positions relative to the inner and outer panel members.

6. A tailgate comprising:

a thick molded inner core member having an outboard face and an inboard face;

an inner cover sheet secured to the inboard face of the core member;

an outer cover sheet secured to the outboard face of the core member;

laterally spaced vertically extending channels defined within the core member; and an extender assembly including a pair of laterally spaced post assemblies slidably positioned respectively in the channels and an upper bar structure interconnecting upper ends of the post assemblies.

7. A tailgate according to claim 6 wherein each post assembly includes a lower post member articulated to an upper post member connected to the bar, the axes of articulation being positioned above an upper edge of the tailgate with the bar in an upwardly extended position, whereby to allow the bar to be moved from its extended position to a displaced position by pivotal movement of the upper post members and the bar about the axes.

8. A tailgate according to claim 7 wherein a multiple position catch structure is defined at the axis of articulation of each post assembly and the tailgate further includes release means operative to release the catch means to allow the bar to be moved from its extended position to its displaced position by pivotal movement of the upper post members and the bar about the axes of articulation.

9. A tailgate according to claim 6 wherein the inner cover sheet includes a main body portion secured to the inboard face of the core member and an upper flange portion extending rearwardly over an upper edge of the core member.

10. A tailgate according to claim 6 wherein the tailgate further includes a molded top cap including a top wall fitted over an upper edge of the core member.

11. A tailgate according to claim 10 wherein the top cap further includes a rear wall extending downwardly proximate the outboard face of the core member.

12. A tailgate according to claim 11 wherein the rear wall of the top cap defines a lower edge fitted against an upper edge of the outer cover sheet.

13. A tailgate according to claim 11 wherein:

the top wall of the top cap defines a central pocket; and the bar structure fits in the pocket in a lowered position of the extender assembly.

14. A tailgate according to claim 12 wherein:

the outer cover sheet defines a central upwardly opening pocket; and the rear wall includes a central downstanding tongue positioned in the outer cover sheet pocket.

15. A tailgate according to claim 11 wherein the tailgate further includes an extender release assembly including a handle positioned in the rear wall of the top cap for ready access by an operator positioned rearwardly of the tailgate.

16. A tailgate according to claim 9 wherein the inner cover sheet further includes channel sidewalls fitted within the channels defined within the core member.

17. A tailgate according to claim 6 wherein:

the tailgate further includes a tailgate release mechanism and an extender release mechanism; and the core member is selectively cut away to accommodate hardware aspects of the tailgate release assembly and the extender release assembly.

18. A tailgate according to claim 17 wherein the core member has a molded honeycomb construction.

19. A tailgate according to claim 8 wherein the release means includes horizontal members extending laterally from the upper post members and operative in response to vertical movement thereof to release the catch means.

* * * * *

UNITED STATES PATENT AND TRADEMARK OFFICE
CERTIFICATE OF CORRECTION

PATENT NO. : 6,988,756 B1  Page 1 of 1
DATED : January 24, 2006
INVENTOR(S) : Joseph Meinke et al.

It is certified that error appears in the above-identified patent and that said Letters Patent is hereby corrected as shown below:

Column 1,
Line 54, add -- defining a thick core -- after "structure"; delete "main" and add -- core --.
Line 55, delete "body".
Line 57, change "main body" to -- core --.
Line 61, change "main" to -- core --
Line 62, delete "body" and "vertically".
Line 63, change "extending" to -- parallel -- add -- s, -- to "channel"; and delete "structures".
Line 65, add -- parallel -- before "post".
Line 67, add -- s. -- to "channel"; delete "structures".

Column 2,
Line 9, delete "main".
Line 10, delete "body".
Line 34, add -- parallel -- after "and".

Colum 4,
Line 13, add -- makes up a thick inner core, -- after "24"; change "in" to -- as -- add -- , -- after "molding".
Line 14, delete "operation".
Line 20, add -- channels or -- after "extending".

Signed and Sealed this

Thirtieth Day of May, 2006

JON W. DUDAS
*Director of the United States Patent and Trademark Office*